C. S. CARPENTER.
Vehicle-Wheel.
No. 207,012. Patented Aug. 13, 1878.
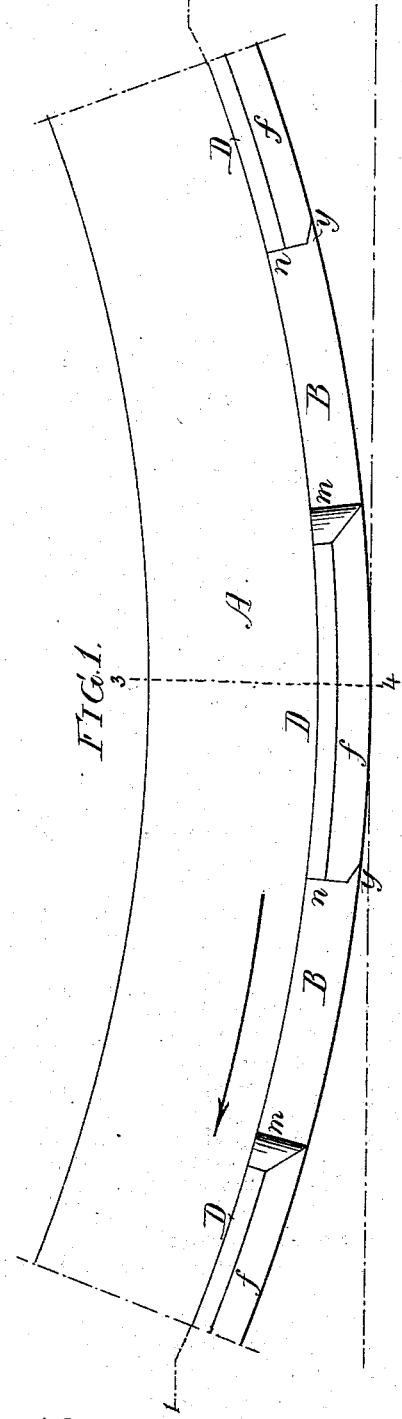
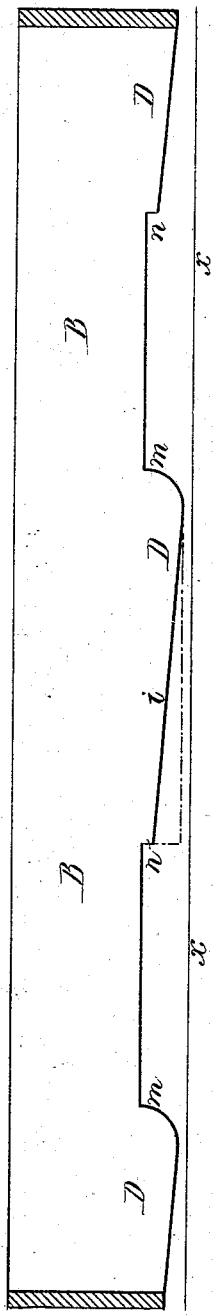
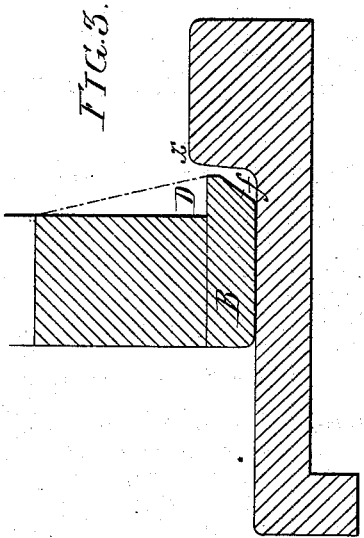
Witnesses,
Harry A. Crawford
Harry Smith
Inventor,
Charles S. Carpenter
by his Attorneys
Howson and Son

UNITED STATES PATENT OFFICE.

CHARLES S. CARPENTER, OF PHILADELPHIA, PENNSYLVANIA.

IMPROVEMENT IN VEHICLE-WHEELS.

Specification forming part of Letters Patent No. 207,012, dated August 13, 1878; application filed May 11, 1878.

*To all whom it may concern:*

Be it known that I, CHARLES S. CARPENTER, of Philadelphia, Pennsylvania, have invented a new and useful Improvement in Wheels for Vehicles, of which the following is a specification:

The object of my invention is to afford facilities for turning the wheels of vehicles from the tracks of street-railways; and this object I attain by providing the wheels with projections of the peculiar character described hereinafter.

In the accompanying drawing, Figure 1 is a side view of part of the rim of a carriage-wheel with my improvement; Fig. 2, a plan view of the tire on the line 1 2, Fig. 1, showing the relation of the projections on the tire to the inner edge of the tread of the rail; and Fig. 3, a transverse section on the line 3 4, Fig. 1.

A represents part of the rim of a carriage-wheel, and B the tire, on which are projections D, placed at about the distance apart from each other shown in the drawing, and the line $x$ $x$ represents the inner edge of the tread of the rail.

The wheel is supposed in the present instance to be one of the fore wheels of the vehicle, and to be rolling in the direction of the arrow on the flange of the rail inside the tread, the vehicle itself in this case, of course, moving forward in the opposite direction.

It will be noted, on referring to the plan view, Fig. 2, that the rear end, $n$, of each projection D is abrupt, and that the front end, $m$, is round and is wider than the rear end, the projection having a gradual taper from one end to the other. It will also be observed, on reference to Figs. 1 and 3, that the outer edge of each projection D is beveled from end to end, as shown at $f$. Should each projection be of uniform width and thickness, there would be too great a tendency on the part of the wheel to leave the track by climbing the edge $x$ of the tread of the rail whenever the animals drawing the vehicle deviated to a slight extent from a direct course. By beveling the outer edge of the projection, however, and narrowing the abrupt rear end, this tendency is prevented, for, should the edge of the projection strike the tread $x$ at any point in the length of the projection between the ends of the same—for instance, at the point $i$—the tendency, owing to the beveled edge of the projection, would be to throw the wheel inward and prevent the rising of the same onto the tread of the rail. In order to effect the latter operation, it would be necessary to so direct the horses as to turn the wheel to such an angle as to bring the lower edge of the abrupt end $n$ of the projection over the tread $x$, when said end $n$ will catch on the tread and cause the raising of the wheel.

I prefer to cut off the lower corner of the end $n$ of each projection, as shown at $y$, Fig. 1, so as to facilitate the catching of the end of the projection on the tread.

As shown in Fig. 3, the projections B extend beyond the rim A; but, if desired, the rim may be beveled, as shown by dotted lines, where the projections occur.

I am aware that it is not new to form projections on the rim of a wheel for the purpose of catching on the tread of the rail, so as to lift the wheel clear of the same, and I do not desire to claim such projections, broadly; but

I claim as my invention—

1. The combination, with a wheel, of a series of projections, D, each projection having an abrupt rear end, $n$, and a beveled outer edge, $f$, as set forth.

2. The combination of the wheel with projections D, each cut off at the corner $y$, as specified.

In testimony whereof I have signed my name to this specification in the presence of two subscribing witnesses.

CHAS. S. CARPENTER.

Witnesses:
HARRY A. CRAWFORD,
HARRY SMITH.